United States Patent
Doraiswami et al.

(10) Patent No.: US 8,424,765 B2
(45) Date of Patent: Apr. 23, 2013

(54) MEMS BARCODE DEVICE FOR MONITORING MEDICAL SYSTEMS AT POINT OF CARE

(75) Inventors: Ravi Doraiswami, Suwanee, GA (US); Michael G. Pecht, College Park, MD (US); Arvind Sai Sarathi Vasan, College Park, MD (US); Yunhan Huang, College Park, MD (US); Andrew Michael Kluger, San Rafael, CA (US)

(73) Assignee: Oxfordian, LLC, Dallas, TX (US)

( * ) Notice: Subject to any disclaimer, the term of this patent is extended or adjusted under 35 U.S.C. 154(b) by 0 days.

(21) Appl. No.: 13/136,083

(22) Filed: Jul. 21, 2011

(65) Prior Publication Data

US 2012/0018514 A1    Jan. 26, 2012

Related U.S. Application Data

(60) Provisional application No. 61/400,098, filed on Jul. 22, 2010.

(51) Int. Cl.
| | |
|---|---|
| G06K 7/08 | (2006.01) |
| G06K 7/10 | (2006.01) |
| G06K 7/14 | (2006.01) |
| G06K 7/00 | (2006.01) |
| G06K 19/00 | (2006.01) |
| H04Q 5/22 | (2006.01) |
| G05B 11/01 | (2006.01) |
| G08C 19/16 | (2006.01) |
| G08C 19/12 | (2006.01) |
| G08B 13/14 | (2006.01) |

(52) U.S. Cl.
USPC .......... 235/451; 235/454; 235/435; 235/487; 235/462.01; 340/572.1; 340/10.1; 340/12.51; 340/13.26

(58) Field of Classification Search ................. 235/487, 235/462.01, 454, 451, 435; 340/572.1, 10.1, 340/12.51, 13.26
See application file for complete search history.

(56) References Cited

U.S. PATENT DOCUMENTS

| | | | | |
|---|---|---|---|---|
| 4,476,149 | A * | 10/1984 | Poppe et al. | 427/2.13 |
| 4,775,786 | A * | 10/1988 | Yamano et al. | 235/490 |
| 6,009,400 | A * | 12/1999 | Blackman | 705/303 |
| 6,685,094 | B2 * | 2/2004 | Cameron | 235/468 |
| 7,036,452 | B1 * | 5/2006 | Tester | 116/207 |
| 7,071,417 | B2 * | 7/2006 | Clare et al. | 174/122 G |
| 7,570,169 | B2 * | 8/2009 | Li et al. | 340/572.7 |
| 8,091,776 | B2 * | 1/2012 | Nemet et al. | 235/376 |
| 8,187,892 | B2 * | 5/2012 | Ribi | 436/166 |
| 8,196,821 | B2 * | 6/2012 | Nemet et al. | 235/383 |
| 2001/0004236 | A1 * | 6/2001 | Letkomiller et al. | 340/572.1 |

(Continued)

Primary Examiner — Daniel Walsh
(74) Attorney, Agent, or Firm — Lawrence Edelman; The Law Office of Lawrence Edelman

(57) ABSTRACT

This invention relates to a novel wireless barcode MEMS canary which can be embedded in electronic systems and periodically monitored to measure degradation over a period of time. The material used to print the bars of the barcode is selected such that it is capable of changing one or more of its properties in response to a change in ambient conditions. Means are provided for reading out said change in properties such that when an interrogator is brought into proximity to the sensor, the change in properties can be detected. By establishing the relationship between the healthy state of the barcode and its degradation to that of the electronic system and the components, the residual life of the system can be established and preventive measures taken before failure.

16 Claims, 5 Drawing Sheets

U.S. PATENT DOCUMENTS

| | | | | |
|---|---|---|---|---|
| 2002/0056756 | A1* | 5/2002 | Cameron et al. | 235/468 |
| 2003/0067704 | A1* | 4/2003 | Woo et al. | 360/69 |
| 2004/0006258 | A1* | 1/2004 | Meyer et al. | 600/300 |
| 2004/0104141 | A1* | 6/2004 | Norrby et al. | 206/459.1 |
| 2005/0122564 | A1* | 6/2005 | Zehner et al. | 359/296 |
| 2005/0139686 | A1* | 6/2005 | Helmer et al. | 235/494 |
| 2005/0282495 | A1* | 12/2005 | Forster | 455/41.2 |
| 2006/0189895 | A1* | 8/2006 | Neel et al. | 600/584 |
| 2006/0244606 | A1* | 11/2006 | Li et al. | 340/572.7 |
| 2007/0057311 | A1* | 3/2007 | Leenders et al. | 257/315 |
| 2007/0158436 | A1* | 7/2007 | Ichikawa et al. | 235/492 |
| 2007/0187507 | A1* | 8/2007 | Natsume et al. | 235/462.1 |
| 2008/0043804 | A1* | 2/2008 | Goldsmith et al. | 374/106 |
| 2008/0136646 | A1* | 6/2008 | Friedrich | 340/572.7 |
| 2008/0173712 | A1* | 7/2008 | Nemet et al. | 235/385 |
| 2008/0303637 | A1* | 12/2008 | Gelbman et al. | 340/10.42 |
| 2009/0020609 | A1* | 1/2009 | Cohen et al. | 235/462.01 |
| 2009/0230182 | A1* | 9/2009 | Nemet et al. | 235/375 |
| 2009/0302102 | A1* | 12/2009 | Nemet et al. | 235/376 |
| 2009/0302115 | A1* | 12/2009 | Dowling | 235/462.01 |
| 2010/0012018 | A1* | 1/2010 | Ribi | 116/207 |
| 2010/0051707 | A1* | 3/2010 | Conzelmann | 235/494 |
| 2010/0103055 | A1* | 4/2010 | Waku et al. | 343/702 |
| 2010/0219235 | A1* | 9/2010 | Nemet et al. | 235/375 |
| 2011/0006109 | A1* | 1/2011 | Nemet et al. | 235/375 |
| 2012/0019386 | A1* | 1/2012 | Doraiswami et al. | 340/573.1 |
| 2012/0044970 | A1* | 2/2012 | Arsenault | 374/159 |
| 2012/0161787 | A1* | 6/2012 | Potyrailo et al. | 324/652 |
| 2012/0266806 | A1* | 10/2012 | Ribi | 116/206 |

* cited by examiner

BARCODE CANARY
PRINTED USING LASER
PRINTER

BARCODE CANARY
ASSEMBLED IN A CARRIER

Working Principle of a Canary

Schematic of Canary Design

Capacitor Canary Parameters $$c = \frac{\varepsilon A}{d}$$

C = capacitance,
ε = permittivity, A = area,
d = distance between plates

Design of Canary Carrier

MEMS BARCODE DEVICE FOR MONITORING MEDICAL SYSTEMS AT POINT OF CARE

CROSS REFERENCE TO RELATED APPLICATIONS

This application claims priority to U.S. Provisional Application Ser. No. 61/400,098, filed Jul. 22, 2010, and entitled MEMS Barcode Device for Monitoring Medial Systems at Point of Care, which application is incorporated by reference as if fully set out herein in its entirety.

FIELD OF THE INVENTION

This invention relates to a novel prognostic monitoring device or system used for monitoring the health of other electronic devices or systems, such as medical equipment. This invention relates more particularly to a barcode type of canary device that can be used, along with other systems, as a sensing device to monitor the "health" of medical systems at the point of care.

GENERAL BACKGROUND

Electronic devices pervade our lives to the extent that they are capable of immobilizing our day-to-day work if they fail to function. Failure of such electronic devices or systems during field operation can be catastrophic. To confront such an open problem requires real-time monitoring of system performance, but this does not provide an advance warning of system failure. Also, there is a need for a solution to deal with warranty, and service issues, as well as to detect the counterfeiting of equipment/components.

Point of care (POC) centers lose millions of dollars in warranty and services required for test systems. Counterfeit electronic components are often responsible for malfunctions and failures of electronics used in POC test systems. POC equipment's system transfer function influence the data provided to patients and a system failure can result in wrong decisions being made about a patient's health.

SUMMARY OF THE INVENTION

The device of the invention can be used to provide a solution to the above stated problems for health monitoring devices or more broadly medical equipment such as an EKG machine during field operation. This is achieved using a device referred to as a "canary". Canaries refer to a system or device that replicates components of host systems and reacts by changing its functional characteristics rapidly when compared with similar functional parameters that drive system performance when subjected to harsh environmental conditions. A canary will thus fail ahead of time, thereby acting like a precursor to system failure. Canaries are used to measure output functional changes that represent failure mechanisms and modes that change under the same environment as the system.

The novel canary of this invention is a barcode canary that can be used as an embedded device that changes its functional characteristics in a fashion similar to the functional parameters of the host system being monitored in response to the environment and changes in those same environmental conditions. The canary (1) enables the operational conditions and health state of host products to be monitored and recorded dynamically via the barcode; (2) degrades when exposed to certain environments; and (3) can be fabricated cost-efficiently. Therefore, it has a wide range of applications including monitoring equipment health states, monitoring environmental conditions, providing advance warning of host product failures, tracking products, and avoiding counterfeiting of electronic equipment.

The barcode canary communicates making use of RFID technology and operates in a fashion similar to the same RFID technology. The barcode canary consists of conductive bars of varying thickness. The bars can be coated with different materials that have properties (e.g. degradation rate, failure mode) corresponding to the materials used in host equipment. The barcode is placed in the same environmental condition as the host system being monitored and is subjected to the same environmental loading conditions.

When exposed to a harsh environment, the conductive material deteriorates, reflecting the degradation in system performance. But the rate of material deterioration can be controlled, making the rate of deterioration of the barcode greater than that of the host system. The barcode can thus be used as canary that provides advance warning of system failure i.e. when there is abnormal change in the material properties that can be termed as canary failure, which will happen well ahead of time of system failure. Using data-driven approaches, the prognostics of system failure can be identified.

The barcode canary has a dielectric layer sandwiched between two metal layers. Both the dielectric layer and the metal layer can be designed to be sensitive to certain parameters in the environment.

The barcode canary can be considered a sensing unit and can be integrated with a wireless transceiver module to form a complete wireless sensor node. The data from these wireless nodes are retrieved in using RFID technology. An interrogator unit wirelessly queries the canary module for system health data. The wireless module is passive in nature and responds to the interrogator using the electromagnetic inductive effect.

These wireless nodes are embedded system-based modules that communicate using radio frequencies. This radio frequency-based technology enables equipment to be identified without making physical contact.

Finally, the system health data collected by the interrogator is transferred to a central server for prognostic evaluation. For system monitoring, dealing with warranties, services, and counterfeiting, information regarding the manufacturer, data of manufacture, identification number, and client details are needed. The central server contains a database of manufacturer, client, and system information in order to identify the system being monitored; thus it contains the above stated parameters.

Wavelet analysis is a powerful technique which we use to identify anomalies in signals. Built-in self test (BIST) is another common practice in testing POC systems these days. Here, wavelet analysis can be used to identify anomalies in system performance using the anomalies in the canary data.

BRIEF DESCRIPTION OF THE DRAWINGS

A better understanding of the above-recited features of the present invention and a more detailed description of the invention that has been briefly summarized above may be gained by referring to various embodiments, some of which are illustrated in the appended drawings. It is to be noted, however, that the appended drawings, which are not necessarily to scale, illustrate only typical embodiments of this invention and are therefore not to be considered limiting of its scope, for the invention may admit to other equally effective embodiments.

DETAILED DESCRIPTION OF THE INVENTION

The barcode canary device of this invention contains a set of sensitive materials can that respond to various environmental factors such as temperature, humidity, pressure and pH. The changes in the environment or usage conditions of a host system will cause the material properties of these sensitive materials to change, which are represented by certain parameters such as impedance and capacitance. One or more of these sensors can be placed at different locations within a piece of medical equipment to monitor the environment immediate to a particular component within the system. An interrogator within a room can be used to monitor the condition of the component using RFID technology, on an ongoing basis and report the results of each interrogation to a central server system where the data can be analyzed to detect early warning of component/system failure. In one embodiment, a single interrogator can be placed in a room where medical equipment is being monitored, and be used to read each of the canary sensors within the range of its RF signal. Being a passive sensor, no battery supply is required for the canary sensor, the RF signal from the interrogator activating its circuitry. In another embodiment, an interrogator can be placed in a hospital room where a patient is positioned, the interrogator activated to query each of the sensors contained with the medical equipment located in the room with the patient. The rate of interrogation is set by the interrogator and can be adjusted.

An exemplary canary device was fabricated from a dielectric sheet cladded with copper. In one embodiment, this can be half ounce copper. Software barcode masks were designed using a desktop laser printer that deposited ink masks (wide and narrow lines) on the copper layer. The whole sheet was then etched using sodium persulphate oxidizer to etch the exposed copper, leaving behind the copper under the printer ink. The ink was removed using acetone and cleaned using methanol and isopropanol. This copper line forms the bars of the barcode (with varying thickness). An illustration of a barcode sheet is presented at FIG. 1A, and an illustration of an individual bar bode inserted into a carrier is presented at FIG. 1B. Not shown is the presence of a second metal sheet on the other side of the dielectric sheet, this second sheet connected to ground to thus complete the capacitor construct, with each line of the barcode above and metal sheet below comprising an individual capacitor circuit.

Figure 1A:
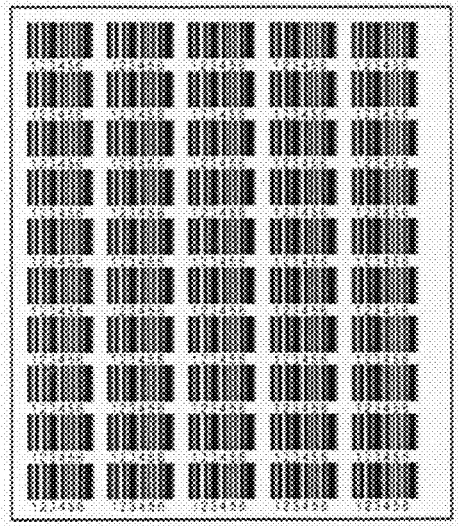
FIG. 1A is an image of a printed barcode sheet according to one embodiment of the invention.
Figure 1B:
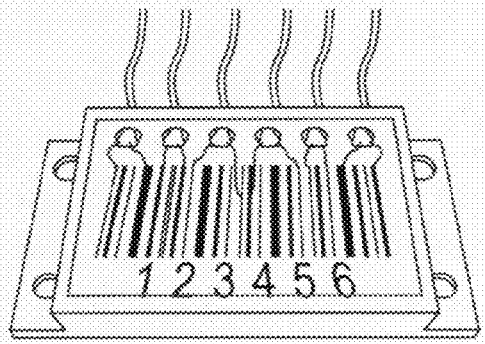
FIG. 1B is an image of a printed barcode inserted into a carrier according to an embodiment of the invention.

It is to be appreciated that the bar code depiction of FIG. 1A is exemplary only, and that more bars representing more data bits can be provided. Regarding FIG. 1B, it should be appreciated that though only two leads per output line are illustrated, a lead from each of the lines can be provided. Additionally, in an alternative embodiment, matching barcode stripes can be formed on the backside of the dielectric sheet whereby all matching bar code stripes are connected to ground to a node of a circuit.

The conductive material may comprise other metals than copper, such as aluminum, tin, gold and silver. In fabrication, these metals can be provided as thin foils and processed in ways similar to those discussed above in connection with copper.

The dielectric material upon which the conductive metal is clad can also be varied, and its properties can likewise be affected by changes in the local environment to which it is exposed. Table 1 below describes some various options for both the conductors and dielectric sheets, and their response to various environmental factors. The changes in capacitance as a function of signal changes can also be tested and correlations determined.

TABLE 1

| Material | Environment Affecting Electronics Materials and Systems | Signal Characteristics Change |
|---|---|---|
| Dielectric material (metal oxide, polymeric material) | a) Humidity/water absorption | Resistance decrease, capacitance increase, dissipation factor increase |
| | b) Humidity/water absorption Suspension particles adsorption | Resistance increases/decreases depending on the number of cycles |
| Semiconductor ($SnO_2$, ZnO, etc.) | $O_2$, $NO_x$, CO, $H_2$, $CH_4$, alcohol adsorption | carrier due to molecular adsorption |
| Semiconductor | High temperature exposure | Resistance decrease |
| Dielectric material | High voltage stress | |
| Metal | Cracks | Resistance increase, RF impedance increase |
| Metal | Corrosion | Resistance increase |
| Semiconductor | Magnetics exposure | Hull Effect |
| Semiconductor | Light exposure | Conductance increases ($\Delta\sigma = q(\mu_n \Delta n + \mu_p \Delta p)$) |
| Piezoelectric material | Mechanical stress | Piezoelectric Effect |
| Metal wire | Mechanical tensile force | Resistance increases (Piezoresistive effect) |

Figure 2:
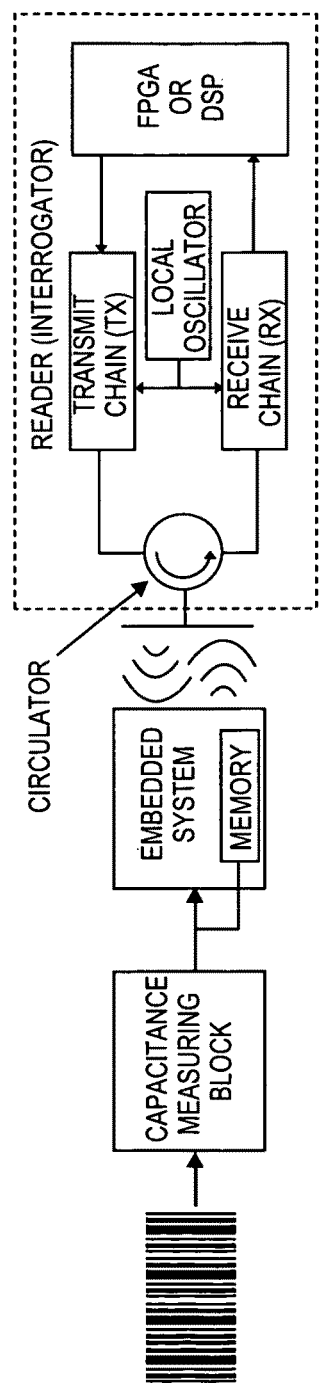
FIG. 2 is a schematic showing the interaction between a wireless sensor node and an interrogator according to an embodiment of the invention, elucidating the mode of communicating system health data for prognostic evaluation.

The barcode canary is integrated with a wireless module for remote monitoring of medical equipment. The collection of such wireless modules can form a wireless network, such as illustrated in FIG. 2. With reference to the figure, analogue capacitance signals from the barcode, generated when the circuit is activated by RF signals from the interrogator, are converted into digital values by a capacitance measuring block, and these signals sent to a memory associated with the device. The memory also contains information about product serial number, manufacture, etc., all of which information can be read when the passive canary system is interrogated by a reader using RF signals.

More particularly, the embedded wireless node consists of a microprocessor or a microcontroller, memory, and a control circuit. The product (or) barcode identification number and manufacturer identification numbers are stored into the read-only part of the processor's memory. Readers or interrogators are used to request and collect the data from the processor. It can also be used to write data to the processor memory. The wireless technology used in this system uses a passive embedded system that makes use of the energy from the electromagnetic wave transmitted by the interrogator. Since, the barcode capacitance data reflects the effects of environmental deterioration of the equipment, this data stored in the memory of the processor must in turn not be affected by the environmental conditions.

Figure 3:
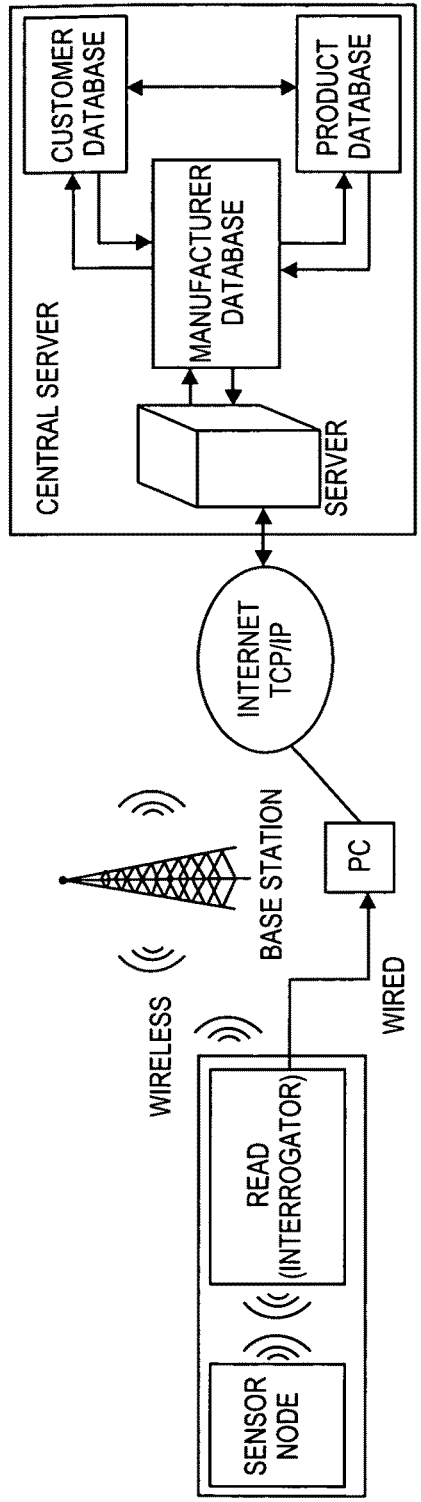
FIG. 3 is a schematic depiction of capacitance data communication from the end node to a central server.
Figure 4A:
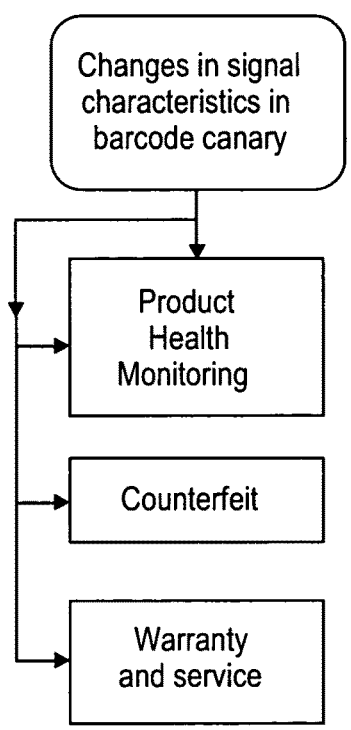
FIG. 4A is a flow chart showing how a sensor according to the invention might be used in detecting defects in a product.
Figure 4B:
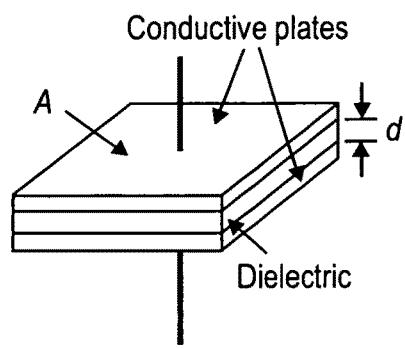
FIG. 4B is a schematic representation of a capacitive circuit disposed in a carrier.
Figure 4B:
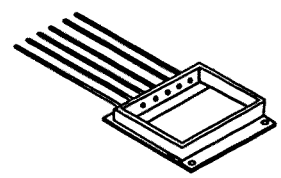
Figure 5:
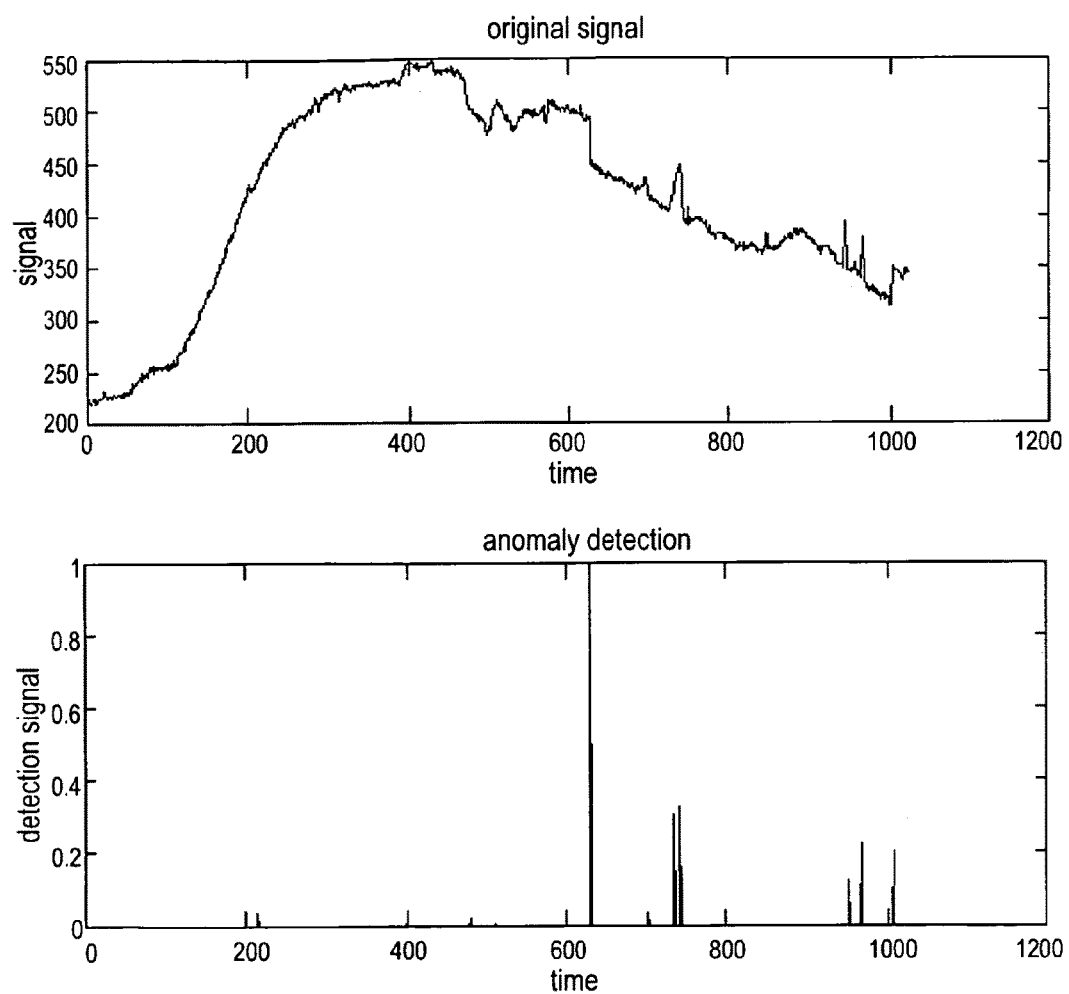
FIG. 5 is a plot representing anomaly detection by wavelet analysis using Minimax thresholding.

The overall network architecture to carry information to the central server consists of a two-tier architecture with the wireless interrogation system connected to a desktop or a base station via a wired or wireless link and, if necessary, to a central server via the Internet (TCP/IP) to collect information regarding the equipment. An exemplary illustration of such a network illustrated in FIG. 3. A suitable middleware resides in the embedded wireless node module to efficiently reduce the complexity of both the transmission and reception of data.

The globally standardized and approved frequency of operation for a passive RFID tag for identifying individual objects is 13.56 MHz, with an operational range of up to a few meters. A similar range of frequency operating around the lower MHz range can be employed for establishing communication between the embedded wireless node and the interrogator. This also allows multiple pieces of equipment to be read simultaneously. The embedded systems according to this invention can be designed to satisfy minimum features such as 1) an electronic product code (EPC) identifier; 2) a barcode identifier; 3) a "kill" function to disable the barcode identifier permanently from processor memory; 4) a password-protected access control; and 5) user memory (for storing capacitance information and for feedback).

The "kill" function allows one to disable a barcode identification number from the processor memory when the equipment is no longer usable. This function also allows one to erase the identification numbers of counterfeit products or barcodes, which, if not erased, may create ambiguity with the existing identification numbers present in the central server. Password-protected access control may be added to allow the tag to decide which interrogator the embedded sensor module of a particular piece of equipment must respond to. User memory is a user-specified memory bank.

Since the barcode canary is scalable in size, each component in the medical equipment can be linked with barcode identification. Individual components in the equipment can be provided with an embedded wireless node. The processor memory in the embedded node holds the identification number of the equipment, the manufacturer, and the last measured barcode capacitance value. This information associated with the equipment (such as date of manufacture, maintenance date, expiration date, etc.) is maintained in a central database. The data from the barcode itself, in addition to providing condition information due to change in properties of the material forming the bars of the barcode, can provide an identification number associated with the data, which number can be used for enhanced identification, operational and/or environmental monitoring or to aid in further analysis.

An identification number associated with the equipment is automatically read through the antenna when the reader is brought into communication range, and the reader (interrogator) sends a query. The information about the present capacitance is measured, stored in the processor memory, and sent to the central database via the interrogator, which serves as the first level of filtering and allows only the information that is needed. By monitoring the equipment periodically, the interrogator keeps the central database updated with the current status of the equipment (in real-time). This information in the central database is synchronized with the equipment maintenance date and expiration date, which allows for timely warranty monitoring and service.

The final step is the analysis of the signal obtained by the server to predict the onset of failure in the host system and isolate the reason for the fault. The signal, which is directly proportional to the capacitance of each of the barcode stripes (which can be the output of the tank circuit), is available at the server through the wired/wireless network. One can perform wavelet analysis to efficiently identify the onset of degradation in the system and subsequently correlate it to the residual life and service level of the system. This analysis can be used to help differentiate between 4 possible cases shown in the Table 2, below, for EKG equipment in a hospital scenario. By finding whether or not the system has failed, it is possible to differentiate between cases 1, 3, and 4 in Table 2, which is otherwise not possible. This can greatly help in proper diagnosis of the patient and also in monitoring the equipment's health.

TABLE 2

| Equipment | Human | Equipment output signal |
| --- | --- | --- |
| Good | Affected | Error in signal (corresponds to human health deterioration) |
| Good | Good | Healthy system and patient health |
| Bad | Good | Signal changes, but this represents equipment deterioration which is shadowed and assumed to be a patient health problem. |
| Bad | Affected | Signal totally corrupted and provides no or much less useful information |

An anomaly can be generically defined as a qualitatively significant change in the behavior of data as defined by the domain of application. Here, during the learning phase, the anomalies in the signal corresponding to each failure mechanism of the component/system will be defined. Wavelets can be used for multilevel signal decomposition. The signal can be recursively decomposed to get finer detail and more general approximation, retaining resolution in time and frequency. The decomposed signals are subjected to hard or soft thresholds to obtain significant data coefficients. The choice of the wavelet, the number of levels of decomposition, and the thresholding scheme will play a major role in the efficient detection of the defined anomaly. One can use level-dependent thresholds, since various defects in the components might cause a fault in one or more levels. The threshold is set based on the fault to be identified. The position of the anomaly in the original can be detected by scanning all the non-zero coefficients in each level.

Figure 6:
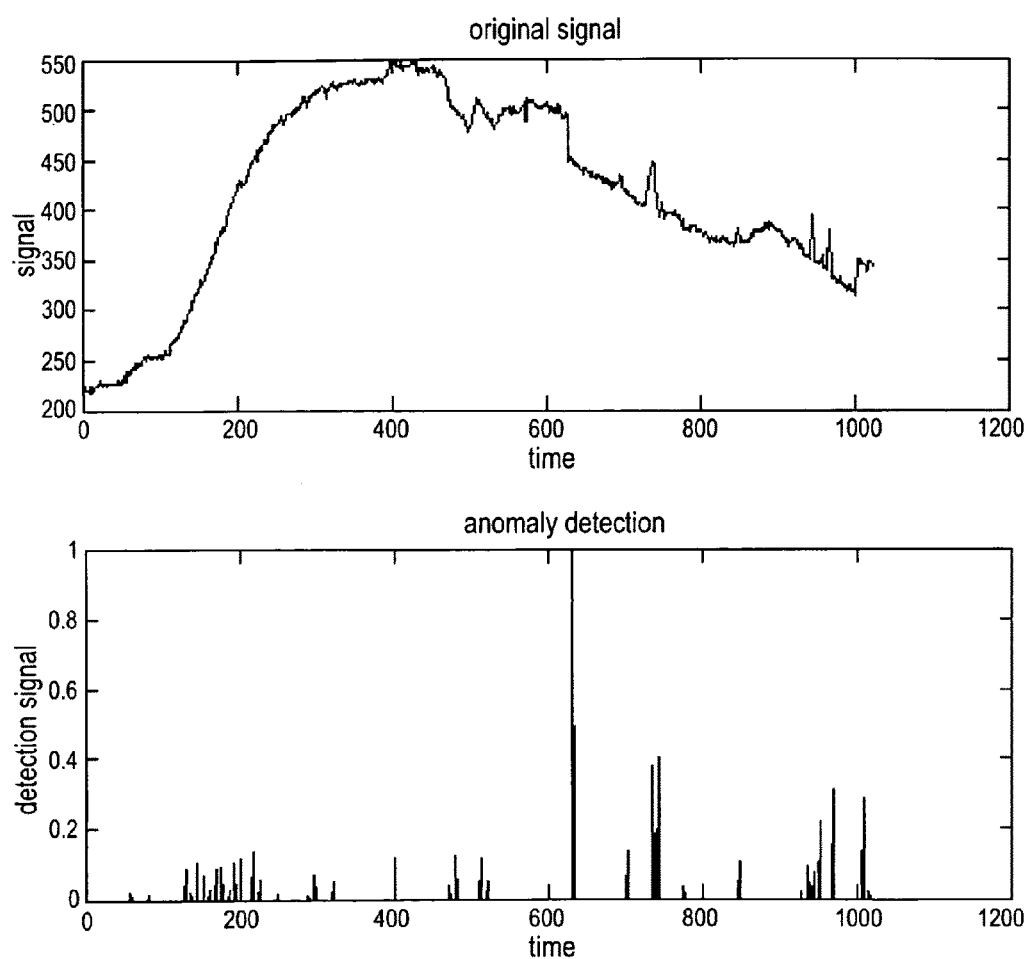
FIG. 6 is a plot representing anomaly detection by wavelet analysis using Rigrsure thresholding.

The implementation of an automatic anomaly detector (with different thresholding schemes) accomplished using MATLAB and a wavelet toolbox is depicted in FIGS. 6 and 7, respectively. For each case, a dB1 wavelet with 4 levels of decomposition was used. The anomalies were defined as a sharp increase in the signal (similarly, anomalies representing a sharp decrease in the signal can be carried out), which is of interest to the user. In each of the figures, the same automatic detector is used with different thresholds. As mentioned before, thresholds can be tweaked to suit the need of the application. Depending on the type of anomaly one is expecting in a barcode signal, an appropriate threshold and wavelet can be selected to automatically detect the anomaly. This thresholding also takes care of eliminating noise (predominantly high frequency components) due to interconnects that transmit the data to the server. Through appropriate programming one can automate detector operation and combine this with feature extraction techniques (to extract the signatures of all expected anomalies) and integrate the two to make the detection and alarm system completely autonomous. By using the information about the exact time of onset of failure and applying failure models, it is possible to calculate the residual life of the system/component. This can be very helpful in hospital management, as it will help in determining when to buy new systems and schedule timely services for certain expensive, critical systems like radiotherapy instruments.

While the foregoing is directed to embodiments of the present invention, other and further embodiments of the invention may be devised without departing from the basic scope thereof, and the scope thereof is determined by the claims that follow.

What we claim is:

1. A sensor system operable to detect the effects of environmental conditions on electronic equipment comprising a barcode canary sized to be embedded within said electronic equipment, said barcode canary including a barcode comprising printed barcode strips of conductive materials that change their material properties in response to changes in environmental conditions, wherein the change in material properties comprises at least one of a change in capacitance measured by the sensor system and a change in resistance measured by the sensor system, wherein said sensor system further includes a wireless module integrated with the barcode canary and operable to wirelessly communicate with an interrogator system that measures the change in material properties by interrogating the module of the barcode canary, and wherein the change in material properties of the barcode canary occurs more rapidly than a change in functional parameters of the electronic equipment in response to the same environmental conditions, thus enabling the barcode canary to function as a precursor operable to predict degradation of the electronic equipment due to the changes in environmental conditions.

2. The sensor system according to claim 1 wherein the conductive material changes its material properties in response to changes in temperature, humidity, pressure, and PH.

3. The sensor system of claim 1 wherein the barcode is combined with a carrier electrically connected to the printed barcode strips of conductive material defining the barcode, such that changes in a property of the conductive material can be detected, converted to a digital signal, and stored in memory of the sensor.

4. The sensor system according to claim 2 wherein the barcode printed strips are formed over a dielectric material.

5. The sensor system of claim 4 wherein the printed strips comprise a conductive metal.

6. The sensor system of claim 5 wherein the conductive metal is selected from the group comprising copper, tin, aluminum, silver or gold.

7. The sensor system of claim 4 wherein a metal is affixed to the backside of the dielectric material.

8. The sensor system of claim 4 wherein the metal affixed to the backside of the dielectric is in the form of a metal sheet.

9. The sensor system according to claim 3 where the change in material properties results in a change in capacitance.

10. The sensor system of claim 9 further including a capacitance measuring block, a system memory and an antenna.

11. The sensor system of claim 10 wherein the manufacturer's serial number of the component being monitored is stored in said sensor.

12. The sensor system of claim 11 wherein the manufacturer's serial number of the component being monitored is stored in the system memory of said sensor.

13. The sensor system of claim 11 wherein the manufacturer's serial number of the component being monitored is stored wherein the barcode is the barcode for said serial number, which barcode serial number can be read by an RF interrogator.

14. A method of retrieving the data stored in the sensor system of claim 10 wherein an RF interrogator is brought into proximity of the bar code sensor system to activate the circuits and read out both generated and stored information.

15. The method of claim 14 wherein the generated information is capacitance.

16. The method of claim 15 wherein the health of the electronic component is monitored by tracking changes in the capacitance of the barcode strips.

* * * * *